(12) United States Patent
Shimizu et al.

(10) Patent No.: US 7,182,645 B2
(45) Date of Patent: Feb. 27, 2007

(54) CARD CONNECTOR FOR AN ELECTRONIC DEVICE AND A CONTACT USED THEREIN

(75) Inventors: Osamu Shimizu, Yokohama (JP); Seiji Shishikura, Chiba (JP); Hisashi Terada, Sakura (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 11/038,274

(22) Filed: Jan. 21, 2005

(65) Prior Publication Data

US 2005/0164559 A1    Jul. 28, 2005

(30) Foreign Application Priority Data

Jan. 23, 2004   (JP)  ............... 2004-016394

(51) Int. Cl.
    *H01R 24/00* (2006.01)
(52) U.S. Cl. ....................... 439/630; 439/157
(58) Field of Classification Search ............... 439/630, 439/64, 541.5, 489, 79, 377, 188, 326–329, 439/74, 159, 157; 361/737, 753
    See application file for complete search history.

(56) References Cited

U.S. PATENT DOCUMENTS

| 1,477,527 A | 12/1923 | Raettig |
| 3,040,291 A | 6/1962 | Schweitzer et al. |
| 3,470,522 A | 9/1969 | Lawrence |
| 3,530,422 A | 9/1970 | Goodman |
| 3,601,774 A | 8/1971 | Stathos et al. |
| 3,631,381 A | 12/1971 | Pittman |
| 3,671,917 A | 6/1972 | Ammon et al. |
| 3,823,367 A | 7/1974 | Kaye et al. |
| 3,932,016 A | 1/1976 | Ammenheuser |

(Continued)

FOREIGN PATENT DOCUMENTS

DE    3 937 383 A1   6/1990

(Continued)

OTHER PUBLICATIONS

Co-pending U.S. Appl. No. 09/869,784; Title: Card Connector filed Oct. 16, 2001.

(Continued)

*Primary Examiner*—Thuc T. Nguyen
*Assistant Examiner*—Edwin A. Leon
(74) *Attorney, Agent, or Firm*—Finnegan, Henderson, Farabow, Garrett & Dunner, LLP

(57) ABSTRACT

A card connector can selectively receive one of two IC cards. The card connector has an improved structure of contacts arranged in a card receiving space to simplify the structure thereof and to allow the card connector to be manufactured easily.

The card connector at least includes a space for receiving a card and a plurality of contacts that are provided in the space parallel to the direction along which a card is inserted. The respective contacts provided in the space for receiving the IC card include a plurality of contact points that respectively correspond to the respective pads of the plurality of IC cards and that are provided in the direction along which the IC card is inserted. Thus, the card connector can be selectively attached with one of a plurality of IC cards having the same pad pitch.

11 Claims, 7 Drawing Sheets

U.S. PATENT DOCUMENTS

| | | | |
|---|---|---|---|
| 3,963,293 A | 6/1976 | McKee | |
| 4,017,143 A | 4/1977 | Knowles | |
| 4,077,694 A | 3/1978 | Cobaugh et al. | |
| 4,184,735 A | 1/1980 | Ammon et al. | |
| 4,220,382 A | 9/1980 | Ritchie et al. | |
| 4,274,699 A | 6/1981 | Keim | |
| 4,392,705 A | 7/1983 | Andrews, Jr. et al. | |
| 4,404,464 A | 9/1983 | Moreno | |
| 4,421,372 A | 12/1983 | Golden | |
| 4,507,697 A | 3/1985 | Ozil et al. | |
| 4,722,693 A | 2/1988 | Rose | |
| 4,734,041 A | 3/1988 | Bruchmann et al. | |
| 4,780,603 A | 10/1988 | Hamada | |
| 4,850,899 A | 7/1989 | Maynard | |
| 4,864,116 A | 9/1989 | Banjo et al. | |
| 5,035,633 A | 7/1991 | Kobayashi et al. | |
| 5,036,430 A | 7/1991 | Hills | |
| 5,080,613 A | 1/1992 | Orui et al. | |
| 5,179,504 A | 1/1993 | Kitahara | |
| 5,198,645 A | 3/1993 | Martin et al. | |
| 5,207,598 A | 5/1993 | Yamada et al. | |
| 5,281,178 A | 1/1994 | Biscorner | |
| 5,300,763 A | 4/1994 | Ito et al. | |
| 5,320,552 A | 6/1994 | Reichardt et al. | |
| 5,374,198 A | 12/1994 | Nagata | |
| 5,401,185 A | 3/1995 | Wang et al. | |
| 5,490,791 A | 2/1996 | Yamada et al. | |
| 5,518,986 A | 5/1996 | Winston | |
| 5,563,397 A | 10/1996 | Fujimoto et al. | |
| 5,581,127 A | 12/1996 | Shinohara | |
| 5,634,819 A | 6/1997 | Pan et al. | |
| 5,668,365 A | 9/1997 | Ito et al. | |
| 5,716,221 A | 2/1998 | Kantner | |
| 5,725,385 A | 3/1998 | Takano et al. | |
| 5,872,353 A | 2/1999 | Reichardt et al. | |
| 5,876,218 A | 3/1999 | Liebenow et al. | |
| 5,904,597 A | 5/1999 | Doi et al. | |
| 5,928,027 A | 7/1999 | Kunishi | |
| 5,933,328 A | 8/1999 | Wallace et al. | |
| 5,993,261 A | 11/1999 | Klatt et al. | |
| 6,004,155 A | 12/1999 | Wu | |
| 6,036,548 A | 3/2000 | Braithwaite | |
| 6,056,573 A | 5/2000 | Nishioka | |
| 6,068,365 A | 5/2000 | Kantner | |
| 6,068,500 A | 5/2000 | Kantner | |
| 6,089,919 A * | 7/2000 | Nishioka | 439/630 |
| 6,099,335 A | 8/2000 | Chang | |
| 6,102,715 A | 8/2000 | Centofante | |
| 6,109,940 A | 8/2000 | Chad et al. | |
| 6,123,557 A | 9/2000 | Wang et al. | |
| 6,126,486 A | 10/2000 | Chang | |
| 6,129,571 A * | 10/2000 | Ikemoto | 439/260 |
| 6,129,572 A | 10/2000 | Feldman et al. | |
| 6,135,809 A | 10/2000 | Asakawa | |
| 6,162,075 A | 12/2000 | Hara et al. | |
| 6,162,089 A | 12/2000 | Costello et al. | |
| 6,174,089 B1 | 12/2000 | Costello et al. | |
| 6,174,198 B1 | 1/2001 | Wu et al. | |
| 6,176,737 B1 | 1/2001 | Choy | |
| 6,183,292 B1 | 2/2001 | Chen et al. | |
| 6,203,378 B1 | 3/2001 | Shobara et al. | |
| 6,213,785 B1 | 4/2001 | Nishio et al. | |
| 6,224,391 B1 | 5/2001 | Horie et al. | |
| 6,234,845 B1 | 5/2001 | Hakozaki | |
| 6,250,965 B1 | 6/2001 | Neifer | |
| 6,250,966 B1 | 6/2001 | Hashimoto et al. | |
| 6,261,128 B1 | 7/2001 | Heim et al. | |
| 6,315,615 B1 | 11/2001 | Raistrick | |
| 6,315,621 B1 | 11/2001 | Natori et al. | |
| 6,328,605 B1 | 12/2001 | Walker et al. | |
| 6,345,760 B1 | 2/2002 | Eason et al. | |
| 6,361,369 B1 | 3/2002 | Kondo et al. | |
| 6,386,920 B1 | 5/2002 | Sun | |
| 6,399,906 B1 | 6/2002 | Sato et al. | |
| 6,402,529 B2 * | 6/2002 | Saito et al. | 439/74 |
| 6,409,546 B1 | 6/2002 | Ito et al. | |
| 6,413,108 B2 | 7/2002 | Centefonte | |
| 6,457,647 B1 | 10/2002 | Kurihashi et al. | |
| 6,468,101 B2 * | 10/2002 | Suzuki | 439/326 |
| 6,482,029 B2 * | 11/2002 | Nishimura | 439/541.5 |
| 6,503,092 B1 | 1/2003 | Sato | |
| 6,508,661 B1 | 1/2003 | Yu | |
| 6,511,349 B2 | 1/2003 | Ishikawa et al. | |
| 6,511,350 B1 | 1/2003 | Ito et al. | |
| 6,524,137 B1 | 2/2003 | Kuo | |
| 6,527,590 B2 | 3/2003 | Oguchi | |
| 6,540,560 B1 | 4/2003 | Ito et al. | |
| 6,601,766 B2 | 8/2003 | Nakagawa et al. | |
| 6,607,404 B1 | 8/2003 | Ito et al. | |
| 6,607,405 B2 | 8/2003 | Nishimura | |
| 6,612,492 B1 | 9/2003 | Yen | |
| 6,641,413 B2 * | 11/2003 | Kuroda | 439/159 |
| 6,645,012 B2 | 11/2003 | Ito et al. | |
| 6,652,322 B2 | 11/2003 | Ito et al. | |
| 6,666,724 B1 | 12/2003 | Lwee | |
| 6,685,512 B2 | 2/2004 | Ooya | |
| 6,699,053 B2 | 3/2004 | Kuroda | |
| 6,699,061 B2 | 3/2004 | Abe et al. | |
| 6,716,066 B1 * | 4/2004 | Kuo | 439/630 |
| 6,749,450 B1 * | 6/2004 | Chen | 439/188 |
| 6,780,062 B2 | 8/2004 | Liu et al. | |
| 6,783,399 B2 | 8/2004 | Joung | |
| 6,793,536 B2 | 9/2004 | Takeyama et al. | |
| 6,863,571 B2 | 3/2005 | Sato et al. | |
| 6,976,879 B2 | 12/2005 | Shishikura et al. | |
| 2003/0157839 A1 | 8/2003 | Yamaguchi et al. | |
| 2004/0026507 A1 | 2/2004 | Nagata et al. | |
| 2004/0106326 A1 | 6/2004 | Hsieh | |

FOREIGN PATENT DOCUMENTS

| | | |
|---|---|---|
| DE | 4 139 482 | 6/1993 |
| EP | 0 284 431 A2 | 9/1988 |
| EP | 0 696 008 | 2/1996 |
| EP | 0 936 705 A2 | 8/1999 |
| EP | 0 939 582 A2 | 9/1999 |
| EP | 1 146 474 | 10/2001 |
| EP | 1 324 256 | 7/2003 |
| GB | 1 487 001 | 9/1997 |
| JP | 44-3701 | 2/1944 |
| JP | 47-34046 | 5/1946 |
| JP | 47-34079 | 5/1946 |
| JP | 49-59071 | 8/1947 |
| JP | 53-81888 | 12/1951 |
| JP | 56-61918 | 10/1954 |
| JP | 47-41714 | 10/1972 |
| JP | 50-56987 | 9/1975 |
| JP | 57-25620 | 2/1982 |
| JP | 61-118980 | 6/1986 |
| JP | 63-133473 | 6/1988 |
| JP | 01-168978 | 11/1989 |
| JP | 01-320713 | 12/1989 |
| JP | 02-187887 | 7/1990 |
| JP | 03-241620 | 10/1991 |
| JP | 04-8618 | 3/1992 |
| JP | 04-249082 | 9/1992 |
| JP | 05-502746 | 5/1993 |
| JP | 06-036834 | 2/1994 |
| JP | 06-044052 | 2/1994 |
| JP | 06-162281 | 6/1994 |
| JP | 06-77178 | 10/1994 |
| JP | 07-153524 | 6/1995 |
| JP | 07-335321 | 12/1995 |
| JP | 08-235981 | 9/1996 |

| | | |
|---|---|---|
| JP | 08-236187 | 9/1996 |
| JP | 08-315081 | 11/1996 |
| JP | 09-007694 | 1/1997 |
| JP | 09-027367 | 1/1997 |
| JP | 10-091729 | 4/1998 |
| JP | 10-187896 | 7/1998 |
| JP | 10-240871 | 9/1998 |
| JP | 11-053503 | 2/1999 |
| JP | 11-111402 | 4/1999 |
| JP | 11-316110 | 11/1999 |
| JP | 2000-502490 | 2/2000 |
| JP | 2000-277200 | 6/2000 |
| JP | 2000-243499 | 9/2000 |
| JP | 2000-251024 | 9/2000 |
| JP | 2000-251025 | 9/2000 |
| JP | 2001-135385 | 5/2001 |
| JP | 2001-195546 | 7/2001 |
| JP | 2001-237027 | 8/2001 |
| JP | 2002-117945 | 4/2002 |
| JP | 2002-124343 | 4/2002 |
| JP | 2002-157056 | 5/2002 |
| JP | 2002-270261 A | 9/2002 |
| JP | 2003-317858 | 11/2003 |

OTHER PUBLICATIONS

Co-Pending U.S. Appl. No. 10/972,653 Title: IC Card-Connecting Adaptor filed Oct. 26, 2004.
English Abstract of DE 4 139 482.
English Abstract of JP 01-320713.
English Abstract of JP 03-241620.
English Abstract of JP 04-008618.
English Abstract of JP 04-249082.
English Abstract of JP 06-036834.
English Abstract of JP 06-044052.
English Abstract of JP 06-077178.
English Abstract of JP 06-162281.
English Abstract of JP 07-335321.
English Abstract of JP 08-235981.
English Abstract of JP 08-236187.
English Abstract of JP 09-007694.
English Abstract of JP 09-027367.
English Abstract of JP 10-091729.
English Abstract of JP 10-187896.
English Abstract of JP 10-240871.
English Abstract of JP 11-053503.
English Abstract of JP 11-111402.
English Abstract of JP 11-316110.
English Abstract of JP 2000-243499.
English Abstract of JP 2000-251024.
English Abstract of JP 2000-251025.
English Abstract of JP 2000-277200.
English Abstract of JP 2000-502490.
English Abstract of JP 2001-135385.
English Abstract of JP 2001-237027.
English Abstract of JP 2002-124343.
English Abstract of JP 2002-157056.
English Abstract of JP 2003-317858.
Office Action in co-pending U.S. Appl. No. 09/840,109 dated Dec. 12, 2001 (Ex. Ta).
Office Action in co-pending U.S. Appl. No. 09/869,784 dated Apr. 4, 2003 (Ex. Figueroa).
Office Action in co-pending U.S. Appl. No. 09/869,784 dated Dec. 10, 2004 (Ex. Figueroa).
Office Action in co-pending U.S. Appl. No. 09/869,784 dated Jul. 7, 2004 (Ex. Figueroa).
Office Action in co-pending U.S. Appl. No. 09/869,784 filed May 9, 2005 (Ex. Figueroa).
Office Action in co-pending U.S. Appl. No. 09/869,784 filed Nov. 7, 2003 (Ex. Figueroa).
Office Action in co-pending U.S. Appl. No. 09/869,784 filed Oct. 18, 2005 (Ex. Figueroa).
Office Action in co-pending U.S. Appl. No. 09/890,637 filed Dec. 17, 2002 (Ex. Hammond).
Office Action in co-pending U.S. Appl. No. 09/890,637 filed Jul. 26, 2002 (Ex. Hammond).
Office Action in co-pending U.S. Appl. No. 09/890,637 filed May 29, 2003 (Ex. Hammond).
Office Action in co-pending U.S. Appl. No. 09/922,866 filed Dec. 12, 2001 (Ex. Nasri).
Office Action in co-pending U.S. Appl. No. 10/046,716 filed May 8, 2003 (Ex. Nguyen).
Office Action in co-pending U.S. Appl. No. 10/067,891 filed Jul. 3, 2002 (Ex. Dinh).
Office Action in co-pending U.S. Appl. No. 10/090,800 filed Mar. 13, 2003 (Ex. Dinh).
Office Action in co-pending U.S. Appl. No. 10/090,800 filed Sep. 24, 2003 (Ex. Dinh).
Office Action in co-pending U.S. Appl. No. 10/721,424 filed Dec. 1, 2004 (Ex. Tsukerman).
Office Action in co-pending U.S. Appl. No. 10/972,653 filed Jun. 28, 2005 (Ex. Levi).
Office Action in co-pending U.S. Appl. No. 10/972,653 filed Nov. 25, 2005 (Ex. Levi).
Office Action in co-pending U.S. Appl. No. 10/972,653 filed Feb. 22, 2006 (Ex. Levi).
Office Action in co-pending U.S. Appl. No. 09/869,784 filed Apr. 12, 2006 (Ex. Figueroa).
Office Action in co-pending U.S. Appl. No. 10/972,653 filed Feb. 22, 2006 (Ex. Levi).

* cited by examiner

CARD CONNECTOR FOR AN ELECTRONIC DEVICE AND A CONTACT USED THEREIN

This application claims priority from Japanese Patent Application No. 2004-016394 filed Jan. 23, 2004, which is incorporated hereinto by reference.

BACKGROUND OF THE INVENTION

1. Filed of the Invention

The present invention relates to a card connector for an electronic device and a contact used therein. In particular, the present invention relates to a card connector that can selectively receive IC cards having different sizes and a contact used therein, in which the contact for electrically connecting the electronic device with the IC card has an improved structure.

2. Description of the Related Art

Recently, more electronic devices such as cell phones, cameras, readers/writers, notebook personal computers, or the like can provide enhanced functions by being connected with an IC card including therein a CPU or an IC for memory control. A conventional card connector as disclosed in Japanese Patent Application Laid-open No. 2001-195546, for example, only has a contact to be connected to one external contact points (pads) on an IC card. Therefore, when required to provide enhanced functions by being connected with a plurality of IC cards having different sizes depending on the functions included in the IC cards, a conventional card connector must include IC card receiving spaces corresponding to the sizes of the respective IC cards and contacts provided in each of the spaces, as disclosed in U.S. Pat. No. 6,402,529. As this causes the card connector to have a larger size, this is not desirable for the recent trend in which electronic devices have lighter and more compact bodies. To resolve the above problems, such a card connector has been suggested that the IC cards having different sizes (e.g., for thickness, length, width) and having the same pad pitch are allowed to be inserted in a common card receiving space as retaining space for the IC card as well as sharing contacts arranged within the card receiving space. By sharing contacts in this way, the card connector can omit the card receiving spaces, thus suppressing the increase in size of the connector and consequently the electronic device.

However, such a contact-sharing structure causes the problem as described below especially in the case of IC cards having different lengths.

Specifically, there will be considered a case in which contacts are provided in the card receiving space so as to correspond to the pad of an IC card for which the length in the direction along which the IC card is inserted to the card receiving space of the card connector is longer. In such a case, when the card receiving space is inserted with an IC card having a shorter length to bring the pad into contact with the contacts, the IC card having a shorter length may be entirely enclosed in the card receiving space of the card connector. This causes a risk in which the pad of the IC card having a shorter length cannot bring into perfect contact with the contacts in the card receiving space, thus preventing the IC card from being attached to the card connector by a function of an eject mechanism. This also makes it difficult, when the IC card is exchanged with another one, to remove by a hand the IC card having a shorter length and being entirely enclosed in the card receiving space and then may completely prevent the IC card from being removed. The reason is that, in the case of a push/push type eject mechanism for example, there is a risk in which this eject mechanism cannot eject the IC card unless the attached IC card is pushed thereto again and, if the IC card having a shorter length is entirely enclosed in the card receiving space as described above, the IC card cannot be pushed thereto again, thus preventing the card from being taken out.

On the contrary, there will be considered a case in which contacts are provided in the card receiving space so as to correspond to the pad of the IC card having a shorter length. In this case, when the card receiving space is inserted with an IC card having a longer length, the rear end of the card excessively protrudes from the card receiving space and thus protrudes from the case of the electronic device. This causes a risk in which the IC card may be an obstacle that may be caught by some reason, thus causing the IC card to be detached from the card receiving space or causing the pad and the contact to have an imperfect contact. In order to prevent this, the electronic device must have an increased size, which is not desirable for a portable electronic device in particular.

In order to solve the problems as described above, the present applicant has already suggested a card connector including a card receiving space in which the rear ends of IC cards having different lengths are set at the same predetermined position. In this case, a plurality of contacts in the card receiving space are arranged in a plurality of rows. Such a structure is complicated with an increased number of components therein and requires a longer time for arranging the contacts in the card receiving space when the card connector is manufactured.

In view of the above, it is an objective of the present invention to provide a card connector in which one of two IC cards can be selectively received therein. This card connector has a card receiving space having an improved structure in which contacts are arranged to simplify the structure thereof and can be manufactured in an easy manner.

SUMMARY OF THE INVENTION

In order to achieve the above objective, a card connector for an electronic device of the present invention can selectively receive one of a plurality of IC cards having the same pad pitch and at least includes a space for receiving a card and a plurality of contacts arranged in the space in parallel with the direction along which the card is inserted. The card connector for an electronic device of the present invention is characterized in that, in the respective contacts arranged in the space for receiving the IC card, a plurality of contact points respectively corresponding to the pads of the plurality of IC cards are provided in the direction along which the card is inserted.

The card connector for an electronic device according to the present invention preferably further includes: a guide mechanism for identifying the plurality of IC cards when the cards are inserted; and an actuator for guiding, based on the result of the identification by the guide mechanism, the IC card to the contact point of the corresponding contact.

Furthermore, the card connector for an electronic device according to the present invention uses such contacts that are attached to the card connector for an electronic device to which one of a plurality of IC cards having the same pad pitch can be selectively received. The contact is characterized in that at least one contact includes at least two contact points provided in a direction along which a card is inserted.

By using a contact having two contact points in the card connector for selectively receiving one of two IC cards, even when IC cards having different sizes are inserted into the card connector, the rear ends of the IC cards can be positioned at the substantially same position to the card connector, thus not affecting the insert and removal of the IC cards to the card connector. This structure does not need a conventional arrangement in which two contacts are provided in a longitudinal direction and requires only one contact, thus reducing the number of required components. This structure also allows the contact to be attached and assembled to the connector body in an easier manner, thus reducing the cost for manufacturing the entire structure. Furthermore, if one card receiving space is provided, the card connector can have a more compact body.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Hereinafter, the card connector according to the present invention will be described with reference to FIG. 1 to FIG. 7C.

Figure 1:
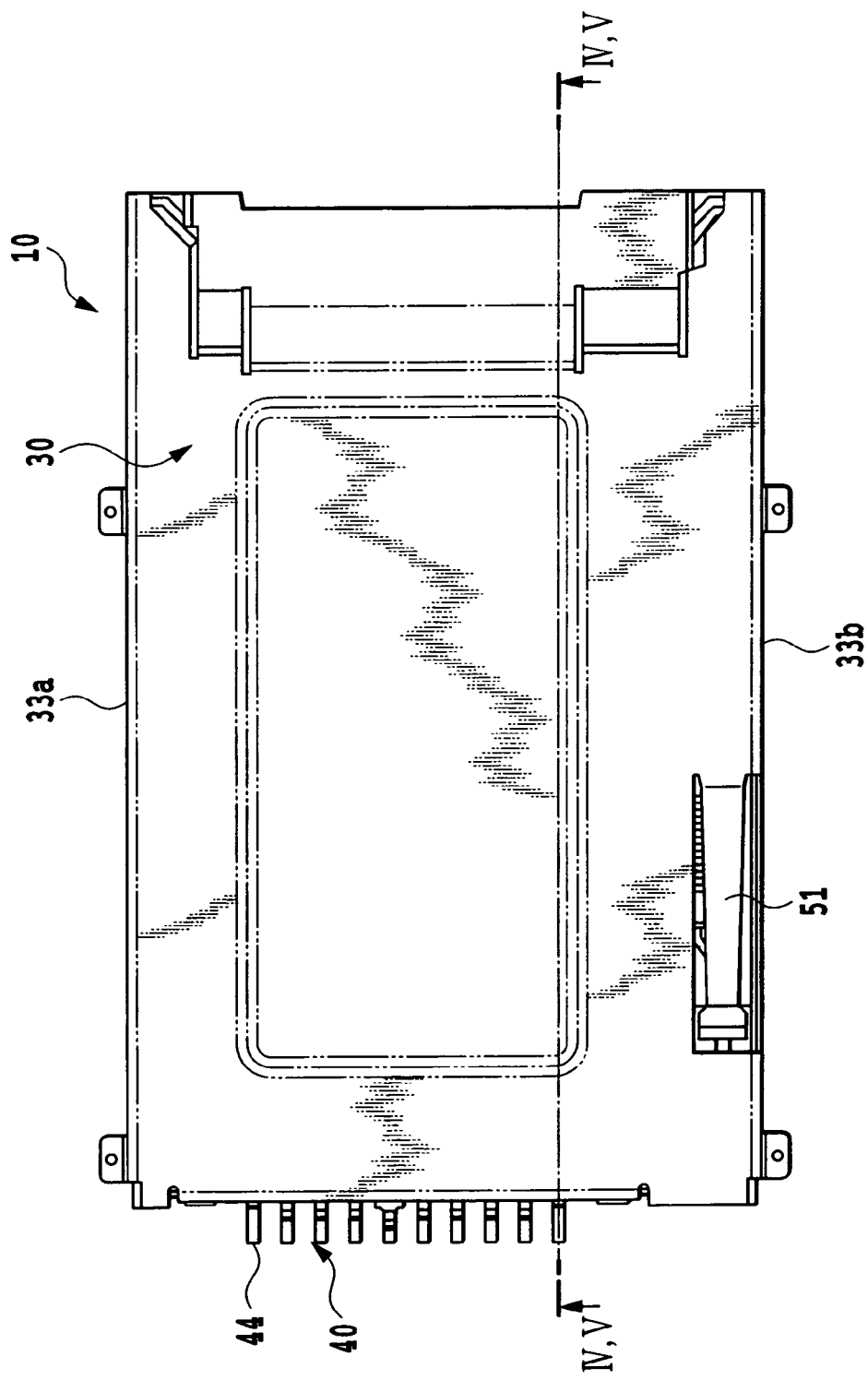
FIG. 1 is a top view of a card connector according to the present invention.
Figure 2:
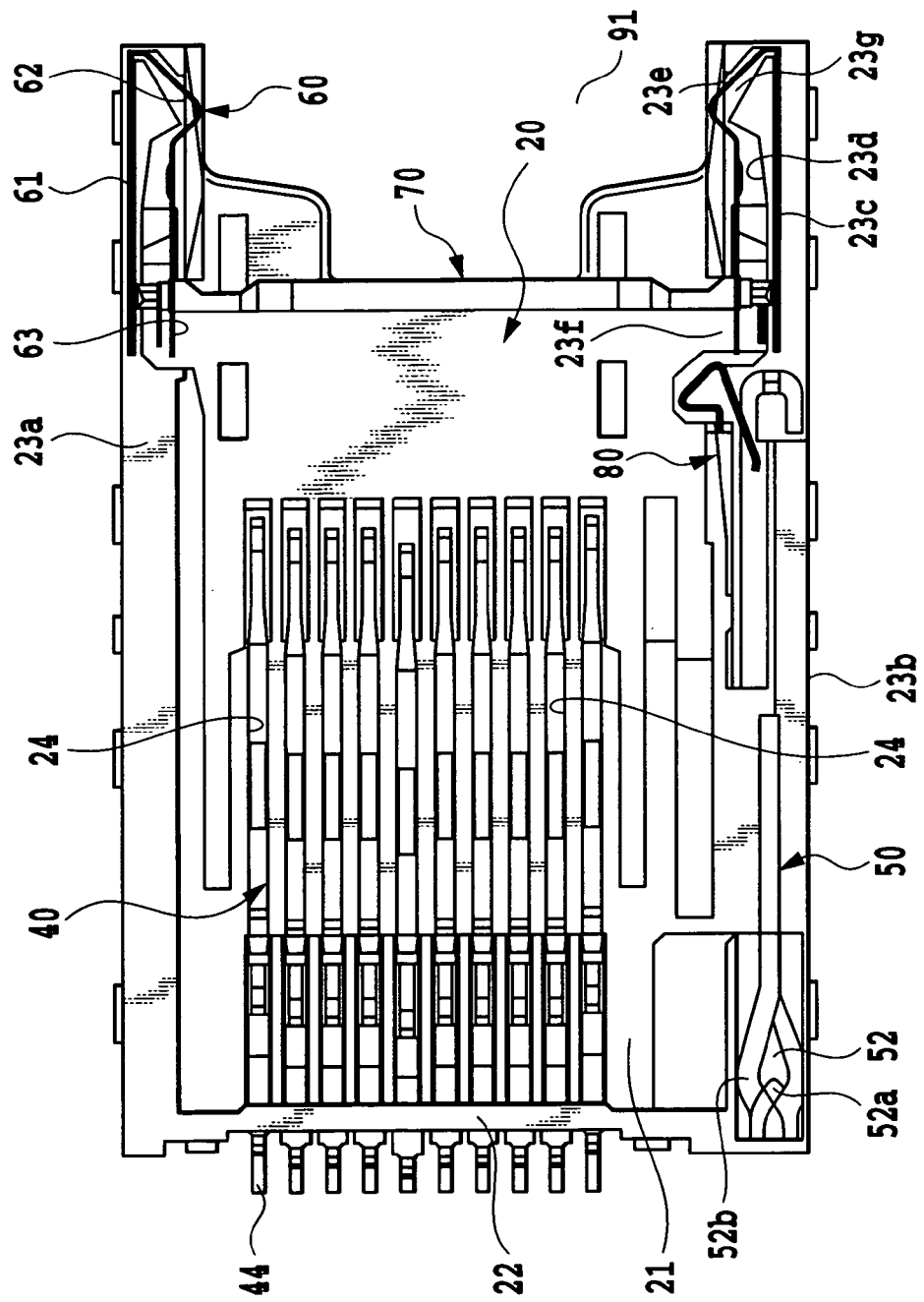
FIG. 2 shows the card connector of FIG. 1 in which the cover member or the like is omitted.
Figure 3:
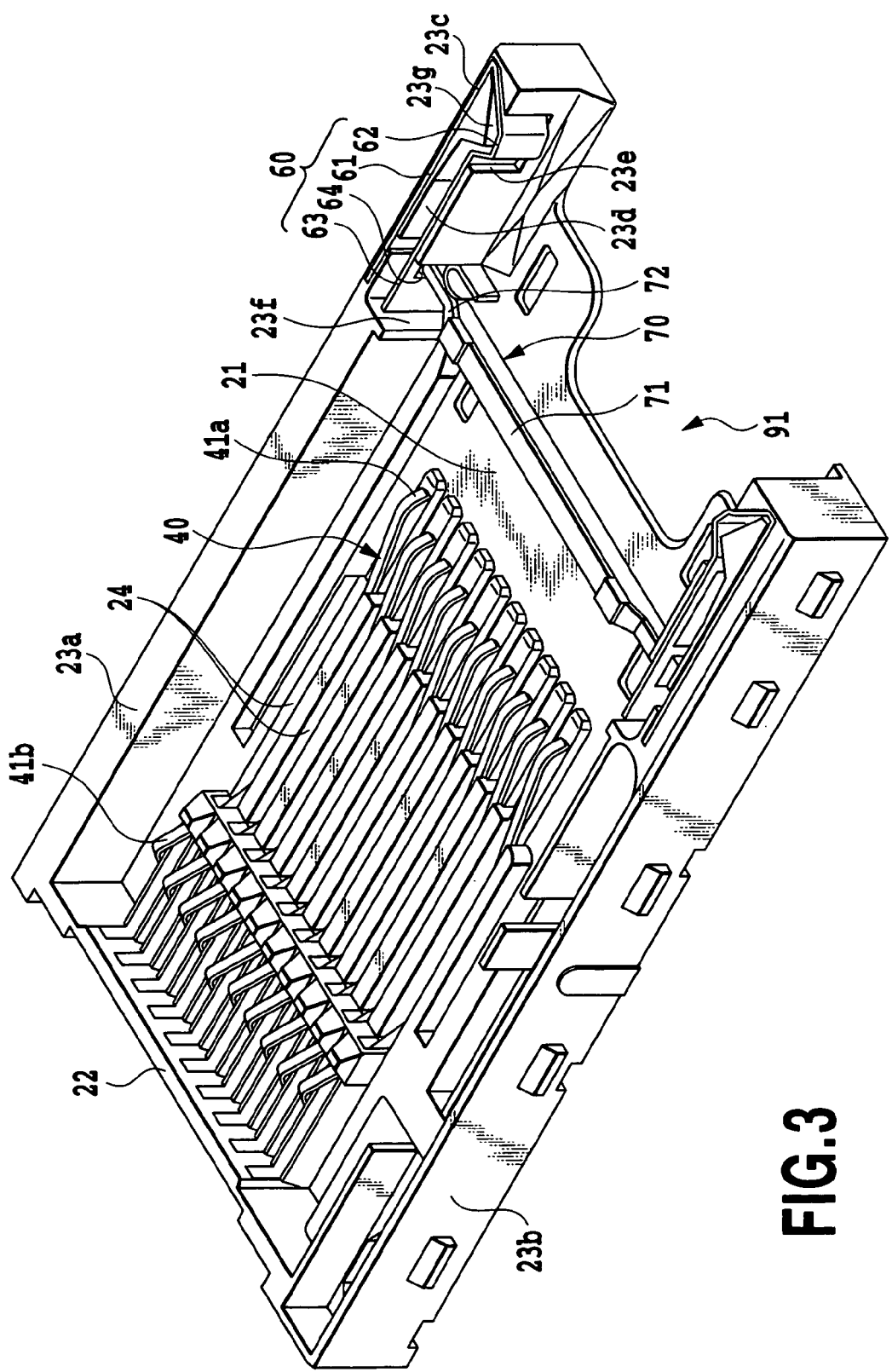
FIG. 3 is a perspective view of the card connector of FIG. 2.
Figure 4:
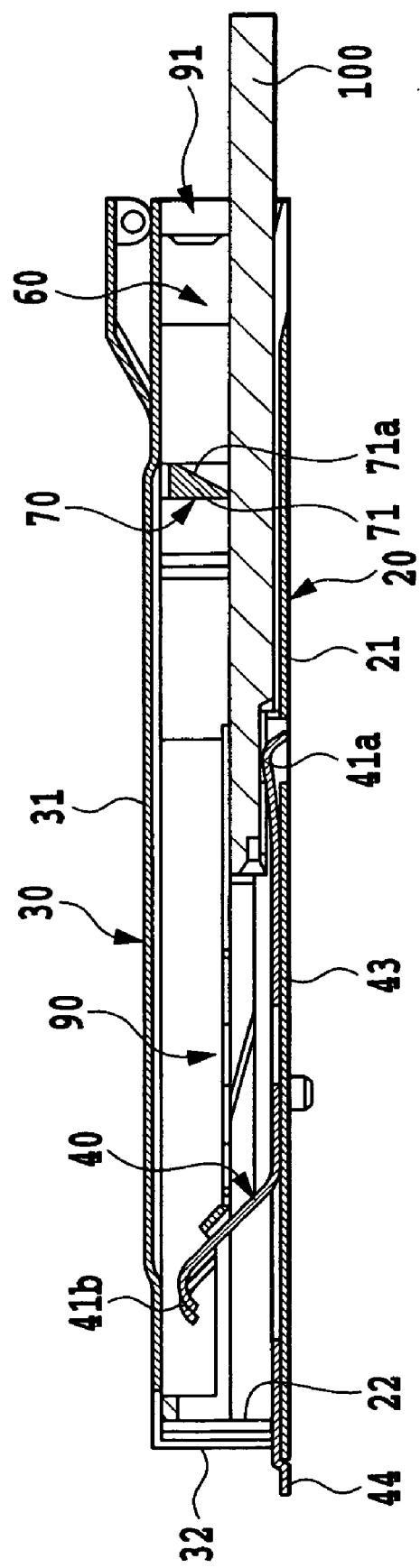
FIG. 4 is a cross-sectional view taken at IV—IV of FIG. 1 and shows the card receiving space of the card connector inserted with an IC card having a shorter length.
Figure 5:
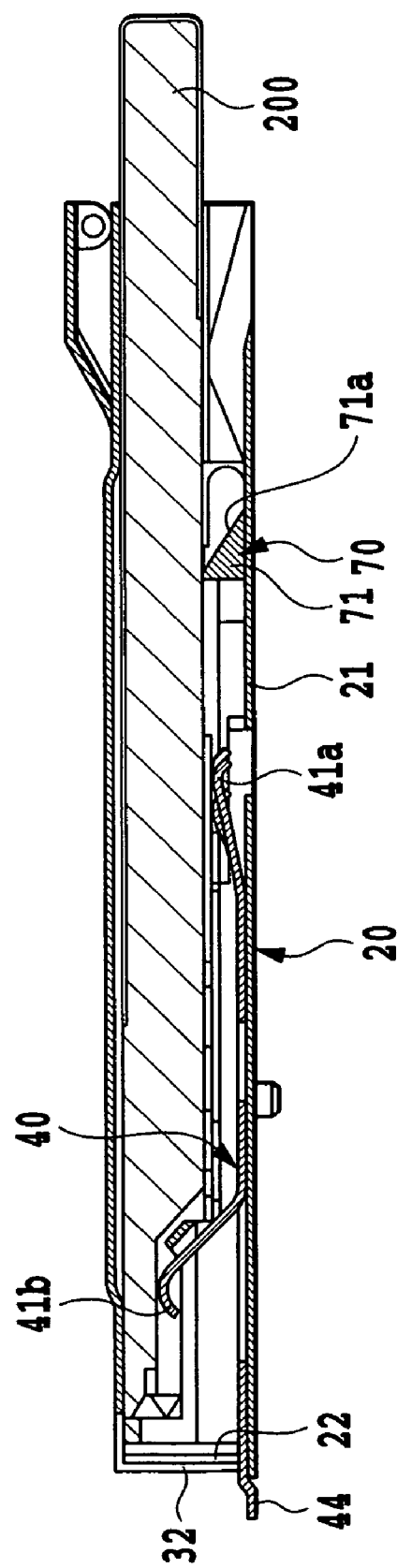
FIG. 5 is a cross-sectional view taken at V—V of FIG. 1 as in FIG. 4 and shows the card receiving space of the card connector inserted with an IC card having a longer length.

FIG. 1 is a top view of the card connector according to the present invention. FIG. 2 illustrates the card connector of FIG. 1 in which the cover member or the like is omitted. FIG. 3 is a perspective view of the card connector of FIG. 2. FIG. 4 is a cross-sectional view taken at IV—IV of FIG. 1 and shows the card receiving space of the card connector inserted with an IC card having a shorter length. FIG. 5 is a cross-sectional view taken at V—V of FIG. 1 as in FIG. 4 and shows the card receiving space of the card connector inserted with an IC card having a longer length. FIGS. 6A to 6E show the structure of the contacts used in the card connector according to the present invention and illustrate various contacts. FIGS. 7A to 7C show an embodiment in which the contact according to the present invention is applied to another card connector.

First Embodiment

A card connector 10 according to the present embodiment is structured to be selectively received with one of two types of IC cards 100 and 200 that have different sizes and that the pitch between pads as external contact points is same, as shown in FIGS. 4 and 5. The two types of IC cards that have different sizes and that are received to the card connector 10 in the present embodiment are two different IC cards one of which is a Memory Stick Duo (®) 100 (hereinafter referred to as "small IC card") that is smaller than the other in all of the length, width, and thickness for example and the other is Memory Stick (®) 200 (hereinafter referred to as "large IC card") that is larger than the small IC card in all of the length, width, and thickness.

As shown in FIGS. 1 to 3, the card connector 10 generally includes: a connector body 20, a cover member 30, a plurality of contacts 40, an eject mechanism 50, a guide mechanism 60, an actuator 70, and a feeling lock member 80.

The connector body 20 is made of an electrical insulating synthetic resin. As shown in FIGS. 2 and 3 in detail, the connector body 20 is a chassis that includes a bottom plate 21, a rear end (left side of the bottom plate 21 in FIG. 2) wall 22, and left and right side (upper and lower sides of the bottom plate 21 in FIG. 2) walls 23a and 23b and that has upper and front (right side in FIG. 2) openings. The bottom plate 21 includes a plurality of contact grooves 24 for fixing the contacts 40 that are provided in parallel at predetermined positions. At the front side (right side in FIG. 2) of the contact grooves 24 provided in the bottom plate 21, small holes are desirably provided in order to assist the first contact points 41a of the contacts 40 to be pushed down in the lower direction (See FIG. 4). The contact groove 24 penetrates the rear end wall 22 so that the terminal portion 44 of the contact 40 can protrude from the rear end wall 22 in the rear direction (left side in FIG. 2).

The left and right side walls 23a and 23b of the connector body 20 include a pair of first grooves 23c and a pair of second grooves 23d for the guide mechanisms 60 at their front end (right end of the bottom plate 21 in FIG. 2) portions. Each of the first grooves 23c is a groove for fixing the guide mechanism 60 to the connector body 20 while each of the second grooves 23d is a groove for receiving the second leg 63 of the guide mechanism 60 in an oscillating manner and has a front opening section 23e and a rear opening section 23f at the front and rear positions (left and right sides in FIG. 2). The second groove 23d communicates with a card receiving space 90 via these opening sections 23e and 23f. The first groove 23c and the second groove 23d are also provided to be substantially parallel to each other and communicate to each other via a groove 23g which makes a substantially V-like shape with the first groove 23c. The front opening section 23e extends across the groove 23g and thus the groove 23g also communicates, via the front opening section 23e, with the card receiving space 90. Furthermore, the connector body 20 cooperates with the pair of guide mechanisms 60 to rotatably support the actuator 70 for guiding the IC card to the card receiving space 90. Therefore, a pair of the rear opening sections 23f need to have opening distances for allowing the actuator 70 to rotate. Furthermore, the connector body 20 supports, at the rear side of the guide mechanism 60 along one side wall (the side wall 23b in the present embodiment), the eject mechanism 50 and the feeling lock member 80.

The cover member 30 is preferably formed by a thin metal sheet but also may be made of a synthetic resin. As shown in FIG. 1 and 4, the cover member 30 includes a top panel 31, a rear end (left end of the top panel 31 in FIG. 1 and 4) wall 32, and left and right side walls 33a and 33b (upper and lower ends of the top panel 31 in FIG. 1) and is formed in a chassis-like shape that has openings at the lower and front sides (right side in FIG. 2) so as to cover the connector body 20 from the upper side.

In this way, the connector body 20 and the cover member 30 constitute the IC card receiving space 90 as a space into which the IC card is inserted. An IC card insertion slot 91 is formed at the front end (right side end in FIG. 1-4) of the IC card receiving space 90 (See FIG. 1-4).

As described above, the plurality of contacts 40 are fixed at the plurality of grooves 24 provided in the connector body 20 and are arranged in parallel to one another.

The structure of the contacts 40 is the most significant characteristic of the card connector according to the present invention. Detailed examples of the structure of these contacts are shown in FIGS. 6A to 6E. The structure of the contacts 40 will be described in detail with reference to FIG. 6A as a representative of the contacts shown in FIGS. 6A to 6E.

Figure 6A:
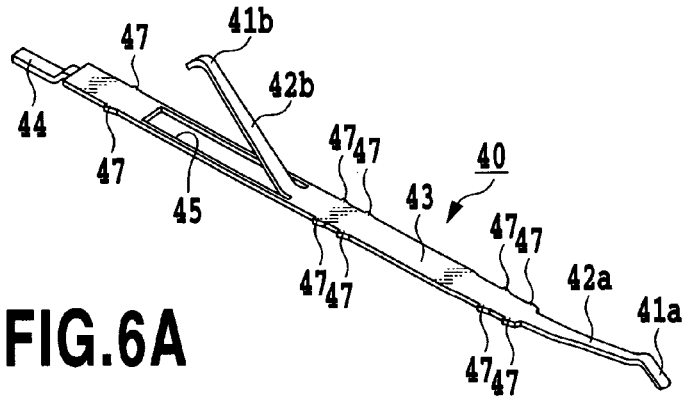
FIG. 6A shows one embodiment of the contact used in the card connector according to the present invention.
Figure 7A:
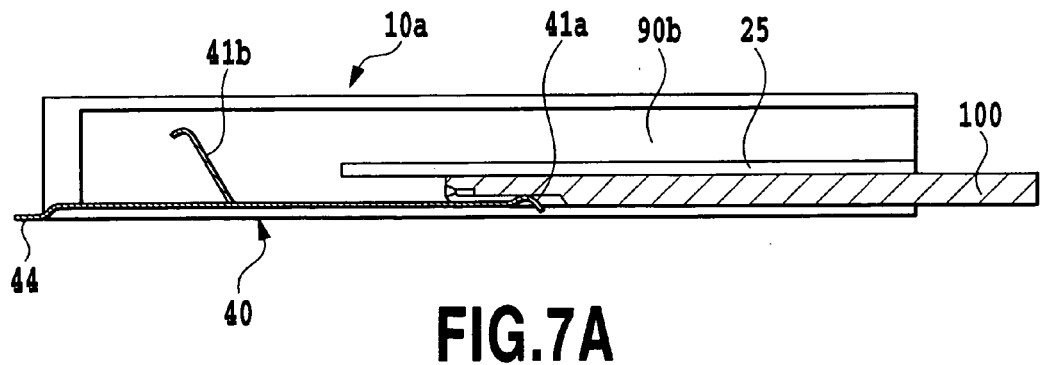
FIG. 7A shows an embodiment in which the contact according to the present invention is applied to another card connector and is a schematic cross-sectional view in which a small card is inserted.
Figure 7B:
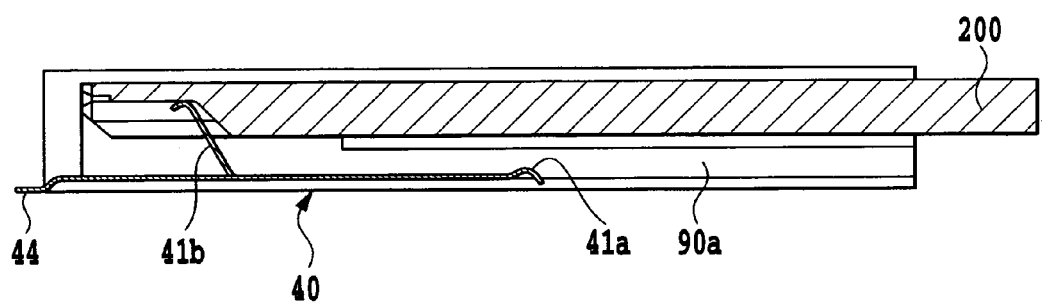
FIG. 7B is a schematic cross-sectional view in which the card connector shown in FIG. 7A is inserted with a large card.
Figure 7C:
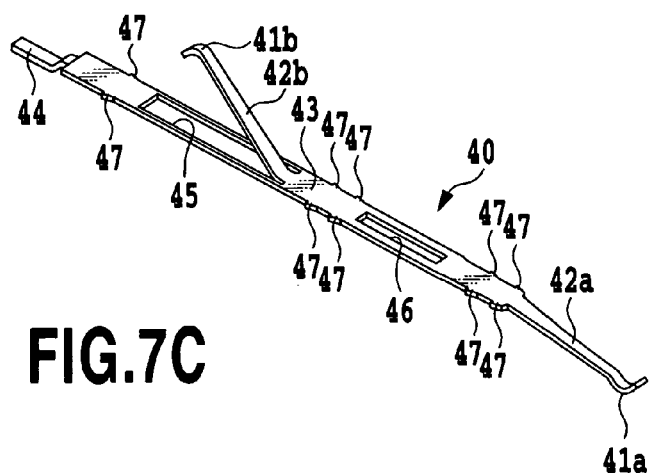
FIG. 7C shows still another contact that can be applied to the card connector shown in FIG. 7A.

As shown in FIG. 6A, the contact 40 according to the present invention is characterized in that two conventional contacts that had been provided separately and that had been provided along the card insertion direction are integrated to provide one contact.

The contact 40 is made of an electrically conductive material such as thin metal sheet and includes the first contact point 41a, the second contact point 41b, the first elastic portion 42a, the second elastic portion 42b, the fixing portion 43, and the terminal portion 44.

The first contact point 41a is positioned at the tip end of the contact 40 and extends in a cantilever-like manner toward the front side from the fixing portion 43 via the first elastic portion 42a. The first contact point 41a is designed so as to be able to contact with the pad of a small IC card.

The second contact point 41b is positioned at the middle of the contact 40 and extends in a cantilever-like manner toward the rear side from the fixing portion 43 via the second elastic portion 42b. The second contact point 41b is designed so as to be able to contact with the pad of a large IC card. The second contact point 41b and the second elastic portion 42b are provided by partially cutting and elevating the fixing portion 43 of the plate-like contact 40.

Figures 6B, 6C:
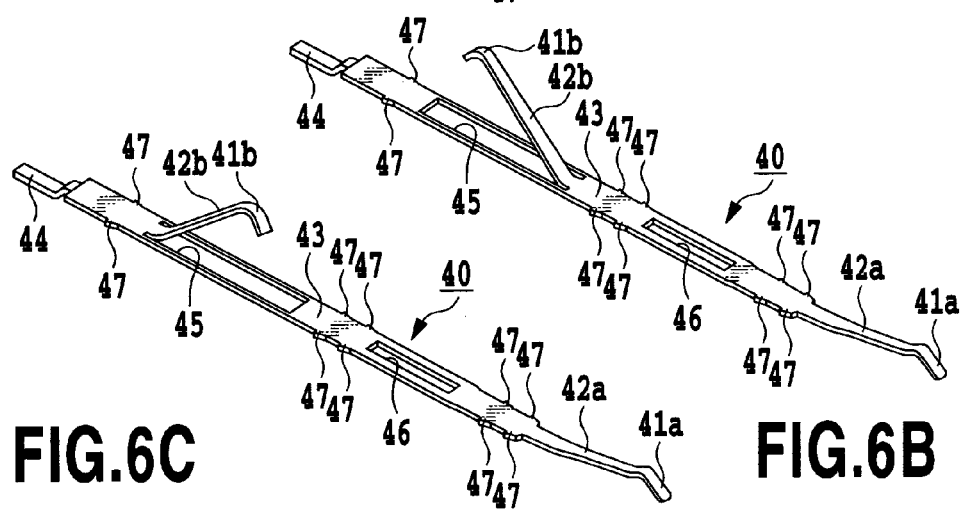
FIG. 6B shows another embodiment of the contact used in the card connector according to the present invention.
FIG. 6C shows still another embodiment of the contact used in the card connector according to the present invention.

The fixing portion 43 has an elongated plate-like shape. At appropriate positions on the left and right sides of the fixing portion 43, there are provided a plurality of locking lugs 47 through which the contacts 40 are pressed-in and-fixed into the grooves 24 of the connector body 20. The fixing portion 43 is provided with a substantially rectangular long hole 45 by partially cutting and elevating the second contact point 41b and the second elastic portion 42b. As shown in FIG. 6B, when the first elastic portion 42a and the second elastic portion 42b are elevated to have a long distance therebetween, a substantially rectangular long hole 46 is preferably provided at the middle part therebetween. These long holes 45 and 46 assist, when the contact 40 is pressed into the groove 24 of the connector body 20 in the longitudinal direction, a jig to be hooked with these long holes so that the contact 40 can be pressed into the groove 24 of the connector body 20 by pulling the jig. These long holes 45 and 46 also are helpful in absorbing the distortion or deformation of the contact 40 during the pressing-in of the contact 40 so that the contact points 41a and 41b can be disposed at correct positions.

The terminal portion 44 is connected to a terminal of a printing circuit of an electronic device by soldering or the like. The terminal portion 44 extends at the opposite side of the first contact point 41a with regards to the fixing portion 43 so as to be positioned at the exterior of the connector body 20 when the contact 40 is fixed in the connector body 20.

Figures 6D, 6E:
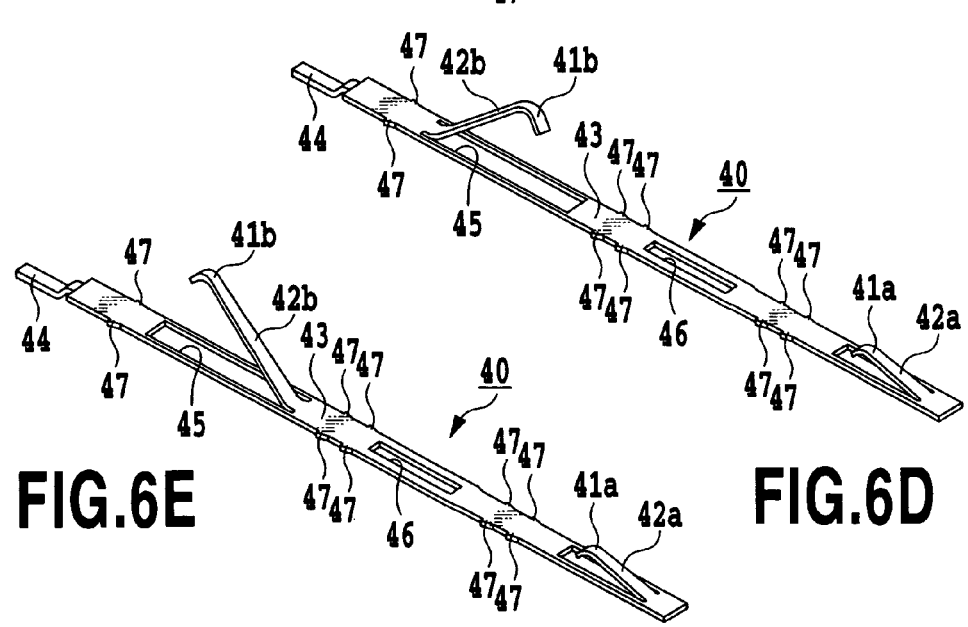
FIG. 6D shows still another embodiment of the contact used in the card connector according to the present invention.
FIG. 6E shows still another embodiment of the contact used in the card connector according to the present invention.

FIGS. 6C to 6E illustrate embodiments of the contact 40 in which various directions are shown along which the contact point extends. In the contacts shown in FIGS. 6D and 6E, the first contact point 41a and the first elastic portion 42a are also provided by partially cutting and elevating the fixing portion 43. When the direction along which the contact point extends is provided rearward as shown by the second contact point 41b of FIG. 6A for example, an IC card is inserted easily but is pulled out difficultly. On the other hand, when the direction along which the contact point extends is provided forward as shown by the first contact point 41a of FIG. 6A, an IC card is pulled out easily but is inserted difficultly. Although the direction along which the contact point extends is preferably provided rearward, the first contact point 41a extending rearward in particular requires the contact 40 to have a longer length, thus increasing the manufacture cost. In this way, the direction along which the contact point extends causes both merits and demerits and is appropriately selected depending on a factor such as the frequency at which the IC card is used, for example.

As described above, the contact of the card connector according to the present invention is formed by integrating two contacts that are provided in the longitudinal direction and that separately have contact points to provide one contact having two contact points. By this structure, the number of components can be reduced and the structure for attaching the contact to the connector body can be simplified, thereby reducing the number of steps for assembling the card connector. This structure also provides an increased freedom in the design of the two contact points and thus can be easily adjusted with regards to the position at which the two contact points are arranged in the direction along the length or height. Furthermore, the space 90 for receiving the card is shared and thus the card connector can have a smaller size.

With regards to the eject mechanism 50, although FIG. 1 illustrates only a cam lever retainer 51 provided by partially cutting and elevating the cover member 30 and FIG. 2 illustrates only a heart cam 52 and the other components are not illustrated, the eject mechanism 50 has the same structure as that of the conventional one. The following will describe the eject mechanism 50 briefly (for the details, see the above Japanese Patent Application Laid-open No. 2001-195546 for example).

The eject mechanism 50 is a device for facilitating the discharge of an IC card from the card connector 10. In the present embodiment, the eject mechanism 50 is provided along the side wall 23b at the left side of the connector body 20 (lower side in FIG. 2). The eject mechanism 50 includes: an eject member to be abutted with the IC card to have a reciprocating movement; a spring for biasing the eject member in the direction along which the IC card is discharged; the heart cam 52 for regulating the reciprocating movement of the eject member; a cam lever one end of which is connected to the eject member and the other end of which as a free end is slid around the heart cam 52; and a cam lever retainer 51 for retaining the cam lever from the upper side so that the cam lever can securely move in a sliding groove 52b provided around the heart cam 52. Although the eject mechanism 50 has been described to be used only for the large IC card 200 in the present embodiment, the eject mechanism 50 also may have another structure provided along the side wall 23a at the right side so as to be used for the small IC card 100.

The eject mechanism 50 will be described with regards to the operation. When the large IC card 200 is inserted to the IC card receiving space 90 of the card connector 10, then the eject member provided in the IC card receiving space 90 is abutted with the IC card 200. Then, the large IC card 200 is moved together with the eject member against the biasing force by the spring and is pushed into a position that is provided a little far from a predetermined position at which the pad of the large IC card 200 is abutted with the contact point 41b of the contact 40 provided in the card receiving space 90. When the operation for pushing in the large IC card 200 is stopped, then the free end of the cam lever having been moving together with the eject member is returned a little along the heart cam 52 while being locked by the concave part 52a at the center of the heart cam 52. As a result, the large IC card 200 is maintained to be attached in the card receiving space 90 of the card connector 10.

When the large IC card 200 is taken out of the card connector 10, the large IC card 200 is pushed in a little so that the free end of the cam lever escapes from the concave part 52a of the heart cam 52. When the operation for pushing in the large IC card 200 is stopped, then the eject member is returned to the original position by the biasing force by the spring, thus allowing the large IC card 200 abutted with the eject member to be discharged from the card receiving space 90.

The guide mechanism 60 is a device that identifies IC cards having different sizes (widths) inserted to the card connector 10 to cooperate with the actuator 70 (which will be described later) to guide the respective cards having different sizes to the corresponding contact point 41a and 41b of the connector 40. The guide mechanisms 60 are provided at the front end portion of the connector body 20 so that the pair is provided along the left and right side walls 23a and 23b. The guide mechanism 60 shown at the upper side of FIG. 2 will be described with reference to FIGS. 2 and 3 herein. The guide mechanism 60 is formed by a thin metal sheet. The guide mechanism 60 includes: the first leg 61 that is engaged with the first groove 23c formed at the outside of the side wall 23a and to be fixed to the socket body 20; the card abutting portion 62 that has a substantially V-like shape from the first leg 61 and that is bent to have elasticity to project from the font opening section 23e toward the inner side (card receiving space 90); the second leg 63 that can be oscillated in the lateral direction (up and down in FIG. 2) in the second groove 23e formed at the inner side of the side wall 23a; and the opening hole 64 that is opened such that the plate-like leg portion 72 at the right side of the actuator 70 (upper side in FIG. 2) is engaged therewith through the rear opening section 23f and the plate-like leg section 72 can be moved therethrough. The first leg 61 and the second leg 63 are arranged to be substantially parallel to each other.

As described above, the actuator 70 is a device that cooperates with the guide mechanism 60 to identify IC cards having different sizes to guide the IC cards having different sizes so that the pads of the IC cards are abutted with the corresponding contact point 41a or 41b of the connector 40. The actuator 70 is provided between the guide mechanisms 60 to be rotatable to the connector body 20. The actuator 70 is also biased by a torsional spring or the like so as to be abutted with the side wall 23a forming the rear opening section 23f of the second groove 23d, i.e., so as to maintain its standing posture (see FIG. 4).

The actuator 70 includes a shutter member 71 extending between the pair of guide mechanisms 60 and a plate-like leg potion 72 extending to the lower side at both ends of the shutter member 71. The actuator 70 has a substantially gate-like shape that has an opening at the lower side when seen from the card insertion slot 91. The shutter member 71 is provided as an inclined plane 71a the front face (face of the card insertion slot 91 side) of which is rearwardly inclined to the lower side. Thus, the shutter member 71 has a cross section having a substantially right triangle shape (see FIGS. 4 and 5). The lower end of the plate-like leg portion 72 of the actuator 70 is pivotally supported by the side wall 23a of the connector body 20 via the rotational center of the actuator 70 (e.g., pin). The plate-like leg portion 72 of the actuator 70 is engaged with the opening hole 64 of the guide mechanism 60 to stop the rotation of the actuator 70.

The gate-like actuator 70 is configured such that the small IC card 100 can pass through a substantially rectangular space provided by the gate-like shape. Specifically, the length of the shutter member 71 (interval between the plate-like leg portions 72) is slightly longer than the width of the small IC card 100 while the height of the plate-like leg section 72 is slightly higher than the height of the small IC card 100.

Hereinafter, the guide mechanism 60 and the actuator 70 having the structure as described above will be described.

When the large IC card 200 is inserted to the card receiving space 90 of the card connector 10, the card abutting portions 62 of the pair of guide mechanisms 60 are abutted with the sides of the IC card 200 to cause the second leg portions 63 following the card abutting portions 62 to be opened in left and right. As a result, the opening holes 64 are disengaged from the plate-like leg section 72 of the actuator 70 and thus the actuator 70 can be rotated. When the large IC card 200 is further inserted in this status, the tip end of the IC card 200 is abutted with the actuator 70. The large IC card 200 cannot go through the actuator 70 and thus pushes down the disengaged actuator 70 to be horizontal while causing the actuator 70 to be rotated rearwardly (see FIG. 5). As a result, the large IC card 200 is guided on the shutter member 71 via the inclined plane 71a of the pushed-down shutter member 71. When the large IC card 200 is perfectly pushed into the card receiving space 90 of the card connector 10 and is attached completely, the pad of the large IC card 200 contacts with the second contact point 41b of the contact 40 provided at the rear side. The large IC card 200 is retained by the top panel 31 of the cover member 30, thus allowing the pad of the large IC card 200 to contact with the second contact point 41b of the contact 40 with an appropriate contacting pressure.

On the other hand, when the small IC card 100 is inserted to the card receiving space 90 of the card connector 10, the small IC card 100 can go through the substantially-rectangular space provided in the actuator 70 under the inclined plane 71a of the shutter member 71 and may be directly pushed-in in the rearward direction and may be attached in the card receiving space 90. Then, the pad of the small IC card 100 contacts with the first contact point 41a provided at the front side of the card receiving space 90. It is noted that the small IC card 100 is retained by the shutter member 71 of the actuator 70 and thus is prevented from escaping in the upward direction. Therefore, the pad of the small IC card 100 may be contacted with the first contact point 41*a* of the contact 40 with an appropriate contacting pressure (see FIG. 4).

By providing the guide mechanism 60 and the actuator 70 to have a structure as described above, a card connector can be provided to which two types of IC cards can be selectively inserted and in which one card insertion slot is provided to allow the card connector to have a simplified structure and to eliminate the need for the thickness of two IC cards that has been required for a conventional card connector when the conventional card connector is inserted with two IC cards, thus allowing the present card connector to have a thinner shape.

The feeling lock member 80 is a device for preventing the large IC card from jumping out of the card receiving space 90 when the large IC card is discharged by the eject mechanism 50. The feeling lock member 80 is provided such that one end of thereof is fixed to the connector body while the other end thereof is formed as a spring member protruding into the card receiving space 90.

Second Embodiment

As described above, the present embodiment described a card connector in which one of two IC cards can be selectively received and one card insertion slot is provided. However, the contact characterized in the present invention also can be applied to a conventional card connector having two card insertion slots, an example of which is shown in FIGS. 7A to 7C. FIG. 7A is a schematic cross-sectional view of a card connector inserted with a small card. FIG. 7B is a schematic cross-sectional view of a card connector inserted with a large card.

As shown in the drawings, the upper stage of the card connector 10*a* has the first card receiving space 90*b* for storing a large IC card while the lower stage thereof has the second card receiving space 90*a* for receiving a small card via a division plate 25, respectively. The contact 40 is provided in the same manner as that of the first embodiment.

When the small IC card 100 is inserted to the lower stage of the card receiving space 90*a*, the first contact point 40*a* of the contact 40 that is provided at the front side to have a lower height is contacted with the pad of the small IC card 100. When the large IC card 200 is inserted to the upper stage of the card receiving space 90*b*, the second contact point 41*b* that is provided at the rear side to have a higher height is contacted with the pad of the large IC card.

In the case of the second embodiment, the contact as shown in FIG. 7C also may be provided at the division plate 25. In this case, the small IC card 100 to be inserted into the lower stage of the card receiving space 90*a* will be inserted therein with a surface of the IC card, i.e. with a surface with pads formed thereon facing up. The card receiving space 90*a* for a small IC card also may be provided at the upper stage while the storage section 90*b* for a large IC card being provided at the lower stage.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A card connector for an electronic device to which one of a plurality of IC cards having the same pad pitch but different card external dimensions can be selectively attached, comprising:
    a connector body having a space configured to receive either of two inserted IC cards having different dimensions; and
    a plurality of contacts provided in the space, said contacts being substantially parallel to the direction along which either IC card is inserted,
    wherein each of the contacts provided in the space has a first contact point disposed on a first elastic portion, a second contact point disposed on a second elastic portion, a plate-like fixing portion, and a terminal portion,
    the first elastic portion is positioned in a cantilever-like manner at a front side of the plate-like fixing portion, and the second elastic portion is positioned in a cantilever-like manner at a rear side of the plate-like fixing portion,
    the first and second contact points are positioned in a front-and-rear relationship along the direction along which either IC card is inserted,
    the first contact point is located to make electrical contact with a first IC card when the first IC card is inserted in the card connector and said second contact point is located to make electrical contact with a second, dimensionally different, IC card when the second IC card is inserted into the card connector.

2. The card connector for an electronic device as claimed in claim 1, wherein the first contact point does not contact the second IC card when the second IC card is inserted and the second contact point does not contact the first IC card when the first IC card is inserted.

3. The card connector for the electronic device as claimed in claim 1, wherein:
    said first elastic portion is formed by partially cutting and elevating a portion of said fixing portion.

4. The card connector for the electronic device as claimed in claim 3, wherein
    said fixing portion is further provided with holes between said first and second elastic portions.

5. The card connector for the electronic device as claimed in claim 3, wherein
    said first and second elastic portions extend in different directions along said contact.

6. The card connector for the electronic device as claimed in claim 3, wherein
    said first and second elastic portions extend in the same direction along said contact.

7. The card connector for the electronic device as claimed in claim 3, wherein
    at least one of said first and second elastic portions is partially cut and elevated to extend in the direction along which the first and second IC cards are inserted.

8. The card connector for the electronic device as claimed in claim 3, wherein
    said first and second contact points have different heights.

9. A card connector for an electronic device to which one of a plurality of IC cards having the same pad pitch can be selectively attached, comprising:
    a space configured to receive one of a first IC card and a second different dimensional IC card;
    a plurality of contacts provided in the space, said contacts being substantially parallel to the direction alone which the first and second IC cards are inserted;

a guide mechanism for identifying which of said first and second IC cards is being inserted; and an actuator for guiding inserted IC cards based on the result of the identification by the guide mechanism, wherein at least one of the contacts provided in the space has first and second contact points in a front-and-rear relationship along the direction in which the IC card is inserted, the first contact point contacts a first pad on the first IC card when the first IC card is inserted, the second contact point contacts a second pad on the second IC card when the second IC card is inserted, when the first IC card is inserted, the actuator guides the first IC card to a position where the first contact point contacts the first pad and, when the second IC card is inserted, the actuator guides the second IC card to a position where the second contact point contacts the second pad.

10. A card connector for an electronic device to which one of a plurality of IC cards having the same pad pitch can be selectively attached, comprising:

a space configured to receive one of a first IC card and a second different dimensional IC card;

a plurality of contacts provided in the space, said contacts being substantially parallel to the direction along which the first and second IC cards are inserted;

a spring-loaded gate dimensioned to permit passage of said first IC card and prevent passage of said second IC card; and a guide mechanism dimensioned to detect insertion of said second IC card and coupled to permit pivoting of said gate upon detection of said second IC card to permit passage of said second IC card into said space, wherein at least one of the contacts provided in the space has first and second contact points in a front-and-rear relationship along the direction in which the IC card is inserted, the first contact point contacts a first pad on the first IC card when the first IC card is inserted, and the second contact point contacts a second pad on the second IC card when the second IC card is inserted.

11. A card connector for an electronic device to which one of a plurality of IC cards having the same pad pitch but different card external dimensions can be selectively attached, comprising:

a connector body having a space configured to receive either of two inserted IC cards having different dimensions; and a plurality of contacts provided in the space, said contacts being substantially parallel to the direction along which either IC card is inserted, wherein at least one of the contacts provided in the space has a first contact point disposed on a first elastic portion, a second contact point disposed on a second elastic portion, a plate-like fixing portion, and a terminal portion, the fixing portion comprises first and second plate-like sections, the first plate-like section extends from the first elastic portion to the second elastic portion, the second plate-like section is disposed between the second elastic portion and the terminal portion, and the first and second plate-like sections lie in a plane substantially perpendicular to a direction in which the first and second contact points deflect, the first and second contact points are positioned in a front-and-rear relationship along the direction along which either IC card is inserted, the first contact point is located to make electrical contact with a first IC card when the first IC card is inserted in the card connector and said second contact point is located to make electrical contact with a second, dimensionally different, IC card when the second IC card is inserted into the card connector.

* * * * *